(12) United States Patent
Clark

(10) Patent No.: US 12,552,009 B2
(45) Date of Patent: Feb. 17, 2026

(54) TOOL

(71) Applicant: Peter Clark, Sussex (GB)

(72) Inventor: Peter Clark, Sussex (GB)

(*) Notice: Subject to any disclaimer, the term of this patent is extended or adjusted under 35 U.S.C. 154(b) by 208 days.

(21) Appl. No.: 17/413,166

(22) PCT Filed: Dec. 10, 2019

(86) PCT No.: PCT/EP2019/084462
§ 371 (c)(1),
(2) Date: Jun. 11, 2021

(87) PCT Pub. No.: WO2020/120490
PCT Pub. Date: Jun. 18, 2020

(65) Prior Publication Data
US 2022/0040840 A1  Feb. 10, 2022

(30) Foreign Application Priority Data
Dec. 11, 2018  (GB) .................................. 1819403

(51) Int. Cl.
*B25G 3/30* (2006.01)
*A01B 1/22* (2006.01)
*B25F 1/02* (2006.01)

(52) U.S. Cl.
CPC ............. *B25G 3/30* (2013.01); *B25F 1/02* (2013.01); *A01B 1/22* (2013.01)

(58) Field of Classification Search
CPC .............. B25G 3/30; B25F 1/02; A01B 1/22
(Continued)

(56) References Cited

U.S. PATENT DOCUMENTS 143,473 A * 10/1873 Stephens ................ B21D 28/34
279/91
191,463 A * 5/1877 Phenix ..................... B26F 1/32
408/202
(Continued)

FOREIGN PATENT DOCUMENTS

CN        2093502      1/1992
EP     1 958 547 A1    8/2008
(Continued)

OTHER PUBLICATIONS

J.K. IPO, Search Report for GB1819403.5, May 23, 2019.
International Searching Authority, International Search Report & Written Opinion for PCT/EP2019/084462, Apr. 3, 2020.

*Primary Examiner* — Hadi Shakeri
(74) *Attorney, Agent, or Firm* — Giordano Law LLC

(57) ABSTRACT

A tool comprising a handle and an implement. The handle comprises an elongate portion having a first end and a second end, and the implement, removably attachable to the handle, comprises an elongate portion at a first end and a tool portion at a second end. In an embodiment of the invention, the handle has, at the first end, a male portion comprising a reducing taper extending from the elongate portion and terminating in a shoulder, and a threaded portion extending from the shoulder and having a cross sectional area lesser than that of the shoulder. In the same embodiment, the implement has, at the first end, a female portion comprising a reducing taper extending inwardly from the first end, a shoulder portion extending from the taper, and a threaded portion extending further inward from the shoulder.

18 Claims, 11 Drawing Sheets

(58) Field of Classification Search
USPC .......................................................... 81/489
See application file for complete search history.

(56) References Cited

U.S. PATENT DOCUMENTS

| | | | | | |
|---|---|---|---|---|---|
| 264,527 | A | * | 9/1882 | Haley | B25G 1/105 |
| | | | | | 81/177.1 |
| 270,661 | A | * | 1/1883 | Hall | F16D 1/092 |
| | | | | | 403/333 |
| 468,529 | A | * | 2/1892 | Beardsley | E21B 17/023 |
| | | | | | 403/360 |
| 1,229,843 | A | * | 6/1917 | Whitaker | B23B 31/113 |
| | | | | | 403/301 |
| 3,173,713 | A | * | 3/1965 | Yasui | A01K 87/02 |
| | | | | | 43/18.1 R |
| 3,347,115 | A | * | 10/1967 | Koch | B23B 31/028 |
| | | | | | 279/91 |
| 4,624,323 | A | | 11/1986 | Burrola | |
| 4,700,420 | A | * | 10/1987 | Belanger | B25F 1/006 |
| | | | | | 294/51 |
| 4,722,645 | A | * | 2/1988 | Regan | B23B 31/006 |
| | | | | | 279/91 |
| 7,028,375 | B1 | | 4/2006 | Schaefer | |
| 7,996,961 | B2 | * | 8/2011 | Blauer | A45B 9/02 |
| | | | | | 81/177.1 |
| 9,868,202 | B1 | | 1/2018 | Burcham | |
| 2010/0269648 | A1 | | 10/2010 | Fenstemaker | |
| 2015/0328766 | A1 | | 11/2015 | Brogden | |
| 2021/0053200 | A1 | * | 2/2021 | Hatamochi | B25D 17/08 |

FOREIGN PATENT DOCUMENTS

| | | |
|---|---|---|
| EP | 2 551 046 A1 | 1/2013 |
| GB | 726 817 A | 3/1955 |
| GB | 2105630 | 5/1985 |

* cited by examiner

TOOL

FIELD OF THE INVENTION

The invention relates to tools, more specifically to tools used in hand excavation, compacting, cutting, digging, and similar operations.

BACKGROUND ART

Workmen and other contractors frequently carry a range of tools with them from site to site to facilitate the completion of a range of tasks. Said tools take up space, can be expensive and are often heavy and bulky, but are vital for carrying out works to be completed in situ. Although workmen and contractors are often employed to carry out a specific type of work, there exists a need to carry a range tools required for carrying out tasks such as groundworks, fencing, gardening, roadworks, railway operations or other such specialised work.

Furthermore, transporting tools in trucks and vans often requires contractors to retrofit their vehicles to provide an organised space for retaining and transporting tools without damage or relative movement inside the vehicle. Finding a specific tool missing or damaged may hamper a contractor's ability to complete a task and result in loss of work.

There therefore exists a need for a tool that is easily transported and is suitable for a range of uses within a specific field.

SUMMARY OF THE INVENTION

The present invention therefore provides a tool comprising a handle comprising an elongate portion having a first end and a second end, and an implement removably attachable to the handle, comprising an elongate portion at a first end and a tool portion at a second end, wherein one of the handle and the implement has, at its first end, a male portion comprising a reducing taper extending from the elongate portion and terminating at a shoulder, and a threaded portion extending from the shoulder and having a cross sectional area lesser than that of the shoulder, and the other of the handle and the implement has, at its first end, a female portion comprising a reducing taper extending inwardly from the first end, a shoulder portion extending from the taper, and a threaded portion extending further inward from the shoulder.

In this way, several notable benefits arise. A variety of implements can be fitted to the handle, so workers who need to physically transport their tools from a vehicle to a work site (which may be remote) need not carry such a great weight. The tool itself can be separated into its constituent parts for storage or transport, which means that longer tools can be fitted into standard courier size packages and thus incur significantly lower shipping fees. At present, longer tools (over about 5 feet or 1.5 metres) often need to be shipped on pallets at significantly greater cost. If one part of the tool breaks or fails, it can be replaced easily without (necessarily) having to replace the other part; this can of course trigger a continuous renewal cycle as each part may need replacement from time to time.

Two-part tools have been proposed in the past but successful implementations have usually been limited to light tasks such as raking or brushing. Tasks which involve greater forces such as digging, breaking concrete, cutting roots, loosening earth and stones, or the like usually overwhelm the join and cause it to fail. However, the provision of a shoulder in the structure as well as a taper ensures that the structural strength is sufficient; the taper carries the non-axial loads arising from digging work or the like, whilst the shoulder absorbs axial loads, including shock loads, and thus protects the thread from stripping and the taper from deformation or fracture. Shock loads of this type are common in digging operations, for example, where the tool may need to be rammed into compacted earth in order to break it up.

The handle can comprise the female portion, and the implement can comprise the male portion, or vice-versa.

The male portion can further comprise a second threaded portion, extending from the taper toward the second end. This second threaded portion can have a cross sectional area lesser than the greatest cross sectional area of the taper, and can also comprise a fastener for cooperating with the second threaded portion, such as a nut. This can be tightened against the end of the female portion in order to provide additional bracing. The second threaded portion can (if desired) be an opposite-direction thread to the first threaded portion.

The female portion can include an aperture between the threaded portion and an external surface of the tool, allowing for external venting of the threaded portion. This will allow fluids such as water to escape from the interior of the female portion, preventing hydraulic damage and assisting with cleaning of the threads, etc.

The implement can be a blade, a fork, a hammer, a chisel, a tamper, a dibber, a dobber, a digger, a drill, an auger, a rammer, a puller, a mattock, a maul, a digging instrument, a shovel or any other form of implement.

The tool can be fabricated from any one of a metal alloy, a polymer, a wood, or a composite material. The handle can be fabricated from the same material as that of the implement, or a different material.

The present invention also relates to a kit of parts for a tool, comprising a handle and an implement, wherein one of the handle and the implement has, at the first end, a male portion comprising a reducing taper extending from the elongate portion and terminating in a shoulder, and a threaded portion extending from the shoulder and having a cross sectional area lesser than that of the shoulder, and the other of the handle and the implement has, at the first end, a female portion comprising a reducing taper extending inwardly from the first end, a shoulder portion extending from the taper, and a threaded portion extending further inward from the shoulder, and wherein the handle and the implement area arranged to be removably attached to one another by mating the male and the female portions.

Further, the present invention provides a tool implement comprising an elongate portion at a first end and a tool portion at a second end, wherein the elongate portion comprises a reducing taper terminating in a shoulder, and a threaded portion extending from the shoulder and having a cross sectional area lesser than that of the shoulder.

The invention also provides a tool handle, comprising an elongate portion with, at one first end, a reducing taper terminating in a shoulder, and a threaded portion extending from the shoulder and having a cross sectional area lesser than that of the shoulder.

The reducing taper, shoulder and threaded portion of the tool implement or handle can be on an external face of the elongate portion, or they can be on an internal face of a bore extending within the elongate portion. The bore can extend coaxially within the elongate portion.

BRIEF DESCRIPTION OF THE DRAWINGS

An embodiment of the present invention will now be described by way of example, with reference to the accompanying figures in which.

DETAILED DESCRIPTION OF THE EMBODIMENTS

The present invention provides a tool comprising a shaft with interchangeable heads in a single tool kit. A range of tools required are therefore present and in an organised and convenient physical format. Duplicate shafts are not necessary (other than for redundancy purposes), thus presenting an overall weight saving.

Figure 1:
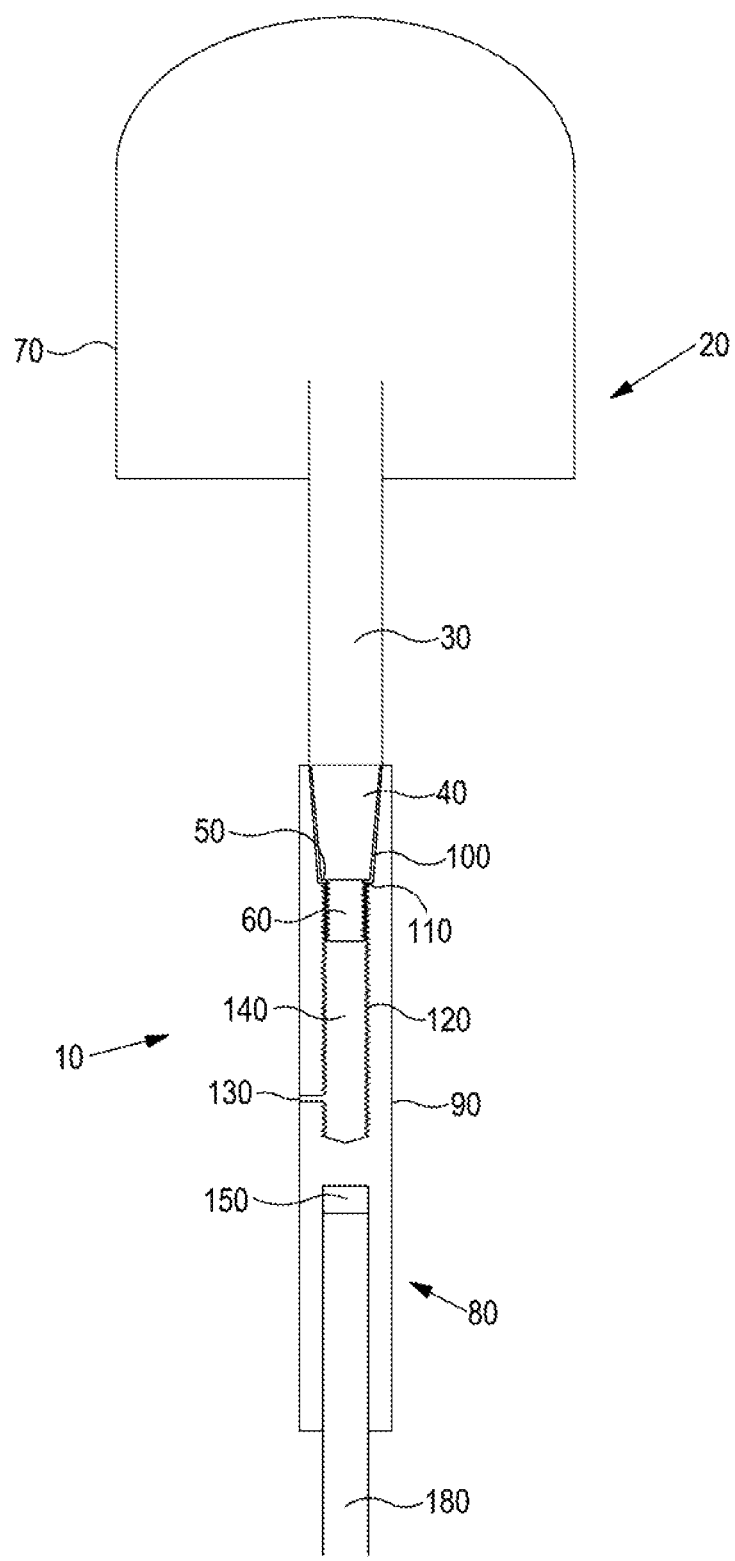
FIG. 1 is a schematic view of an assembly according to a first embodiment of the invention.

FIG. 1 shows a tool 10 in accordance with a first embodiment. The tool 10 comprises an implement 20 and a shaft 80.

In the present embodiment, implement 20 has an elongate portion 30 with an external profile that is cylindrical and of substantially constant cross sectional area. A taper 40 extends longitudinally from elongate portion 30 toward the extremity of a first end of implement 20. The taper 40 reduces in cross sectional area and terminates in a shoulder 50. Shoulder 50 provides a face perpendicular to the longitudinal axis of the elongate portion 30. Shoulder 50 has a height in the direction of the longitudinal axis of the elongate portion. A threaded portion 60 extends from the shoulder 50 and away from elongate portion 30. In the present embodiment, the cross sectional area of the threaded portion 60 is less than or equal to that of the implement 20 at the shoulder 50. In further embodiments, the cross sectional area of the threaded portion 60 is equal to that of the implement 20 at the shoulder 50.

The implement 20 comprises a tool portion 70. Tool portion 70 is shown in FIG. 1 as a blade for cutting and/or digging. The blade of tool portion 70 may be any known shape of blade, including rounded or square.

Shaft 80 comprises an elongate portion 90 that has an external profile that is cylindrical and of substantially constant cross sectional area. The elongate portion 90 comprises a cavity 140 comprising a taper 100 extending inwardly from a first end. Taper 100 reduces the cross sectional area of cavity 140 of elongate portion 90 as it extends inward. Taper 100 terminates in a shoulder 110 that further reduces the cross sectional area of cavity 140. Shoulder 110 provides a face perpendicular to the longitudinal axis of the elongate portion 90. Shoulder 110 has a height in the direction of the longitudinal axis of elongate portion 90. Extending further inward from shoulder 110 the surface of cavity 140 comprises a threaded portion 120.

In the present embodiment, the entirety of the surface of cavity 140 extending internally beyond that of shoulder 110 comprises threaded portion 120. In further embodiments, a portion of the surface of cavity 140 extending internally beyond that of shoulder 110 has any suitable surface finish.

Cavity 140 is vented to the surrounding air by an optional feature, aperture 130. Aperture 130 is located in a side wall of elongate portion 90. This arrangement allows air to circulate so no pressure or suction force is formed inside cavity 140, which ordinarily comprises ambient air. Aperture 130 allows foreign matter such a dust and fluid formed or condensation, for example, to drain from cavity 140.

The elongate portion 90 has internal geometry shaped for cooperation with the taper 40, shoulder 50 and threaded portion 60 of implement 20, which form a male portion. Thus, in the present embodiment, shaft 80 comprises a female portion. Each of the tapers 40, 100 extend a substantially equal distance in the longitudinal direction such that elongate portion 90 extends toward elongate portion 30. In a preferred embodiment, elongate portion 90 covers taper 40. In further embodiments, elongate portion 90 extends beyond taper 40 to cover a portion of elongate portion 30. The external cross sectional area of elongate portion 90 is therefore greater than that of elongate portion 30.

In a further preferred embodiment, elongate portion 90 extends over taper 40 such that a portion of taper 40 adjacent elongate portion 30 is exposed.

When implement 20 and shaft 80 are assembled, implement 20 is removably attached to shaft 80 by threaded portion 60 cooperating with threaded portion 120. The threaded portions 60, 120 are rotated relative to one another such that threaded portion 60 of implement 20 moves longitudinally into cavity 140 until shoulder 50 abuts shoulder 110.

The abutment of shoulders 50, 110 provides a surface through which forces caused by impact on the tool 10 is in use may act. This prevents damage to threaded portions 60, 120, and prevents shearing or stripping of the threads. The buttressing effect is further enhanced by the surface of taper of handle 40 cooperating with surface of taper 100.

Shearing or stripping of the threads is prevented by the directional force generated by impact of the tool portion 70 in use acting on the face of shoulder portions 50, 110 arranged transverse the direction of force. Consequently, compressive forces will be prevented from forcing the implement handle 20 further into cavity 140. As such, the strength of the threaded portions 60, 120 is generally considered sufficient to retain implement 20 and shaft 80 relative one another in use. However, where standard screw threads are considered insufficient against such forces, threaded portions 60, 120 may comprise a square thread, a buttress thread or other such arrangement providing a load bearing thread face perpendicular to the screw axis to provide further shear strength.

The cooperation of shoulder portions 50, 110, arranged with surfaces perpendicular to the longitudinal axes of elongate portions 30, 90 respectively, also prevents the ingress of moisture, dirt, and other foreign matter, further protecting threads 60, 120 and cavity 140. Aperture 130 may be used as a port for oil or grease to be applied to threads 60, 120 for conditioning of said threads or for ensuring the free movement of implement 20 relative shaft 80, or vice versa.

A handle 180 is provided for gripping by the user in use. In the present embodiment, handle 180 has an external profile that is cylindrical and of substantially constant cross sectional area. However, in further embodiments, handle 180 has a profile that is ergonomically shaped, or has ergonomic shaping over a portion of the handle.

A second cavity 150 is provided in shaft 80, extending inward from a second end opposite the first, for receiving a portion of handle 180. The breadth and depth of second cavity 150 is sized to receive an end portion of handle 180. Handle 180 may be of any suitable external cross-sectional area. Handle 180 is preferably 5 imperial feet in length or less. Handle 180 may be fabricated of wood, fibre glass or any other suitable material. In the present embodiment, handle 180 is retained within second cavity 150 by the application of an adhesive to the surface of second cavity 150 or a portion of handle 180.

In a further preferred embodiment, a cover is applied to an area of the shaft 80 and handle 180 and subsequently subjected to a heat shrink process. The resulting sleeve retains the handle 180 relative shaft 80. Said sleeve may also provide insulation to the user in a gripping area where the shaft and/or handle is comprised of an electrically conducting material. This is particularly advantageous where a tool according to the present invention is used in the vicinity of live cables or electrical systems and/or appliances.

Figure 2:
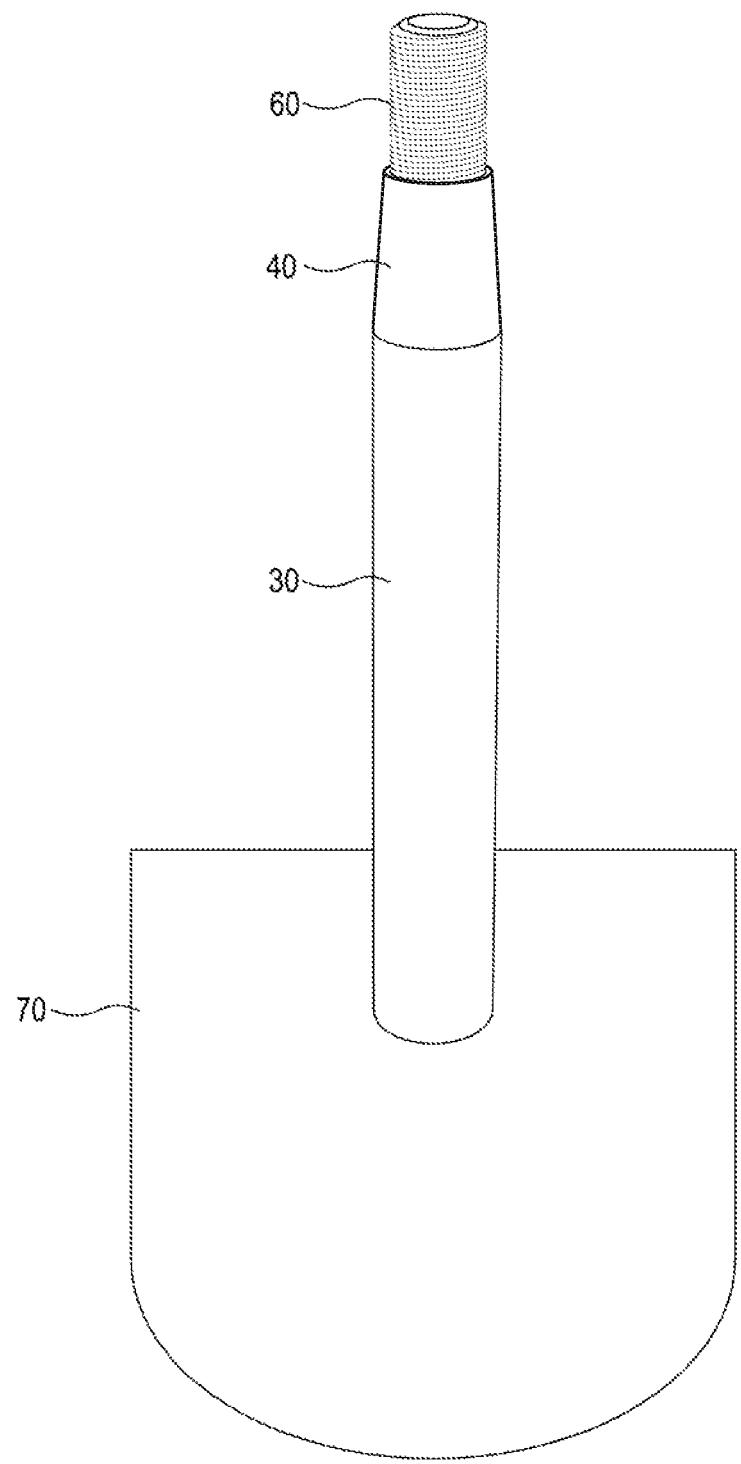
FIG. 2 is a perspective view of a first embodiment of an implement of the invention.

FIG. 2 shows the embodiment of implement 20 shown in FIG. 1 in further detail. In this preferred embodiment, elongate portion 30 has an external diameter of approximately 25 mm. Taper 40 is ridged to provide a friction fit with the surface of taper 100. The largest cross sectional area of shoulder 50 measures 18 mm in diameter, and shoulder 50 has a height of 2 mm extending in the direction of the longitudinal axis of elongate portion 30.

Threaded portion 60 is provided with a 16 mm diameter thread, or ISO standard M16 metric thread. Threaded portion 120 of implement 80 will be correspondingly sized for cooperation with threaded portion 60, as will the dimensions of shoulder 110 for cooperation with shoulder 50.

Figure 3:
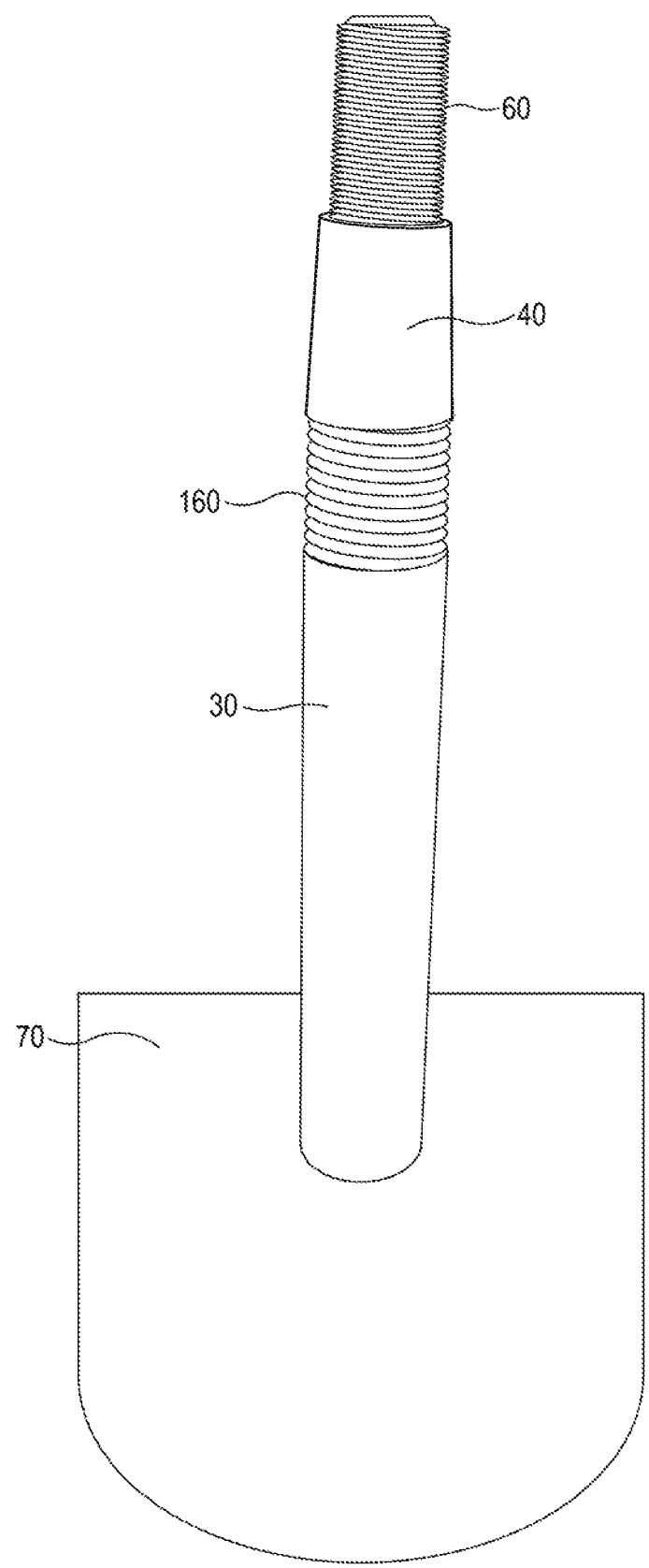
FIG. 3 is a perspective view of a second embodiment of the implement of the invention.

FIG. 3 shows a second embodiment of implement 20 further comprising a second threaded portion 160. The second threaded portion 160 extends from the elongate portion 30 to tapered section 40. In a preferred embodiment, elongate portion 30 has an external diameter of 25 mm. Second threaded portion 160 has an external diameter of 24.6 mm and is an ISO standard M25 thread. The portion of tapered section 40 having the largest cross sectional area has a diameter of 25 mm. Shoulder 50 has an external diameter of 18 mm, which corresponds to the smallest cross sectional area of tapered section 40. Shoulder 50 has a height of 2 mm extending from tapered section 40 toward threaded portion 60 and, subsequently, the extremity of first end of implement 20. Threaded portion 60 is an ISO standard M16 thread.

Figure 4:
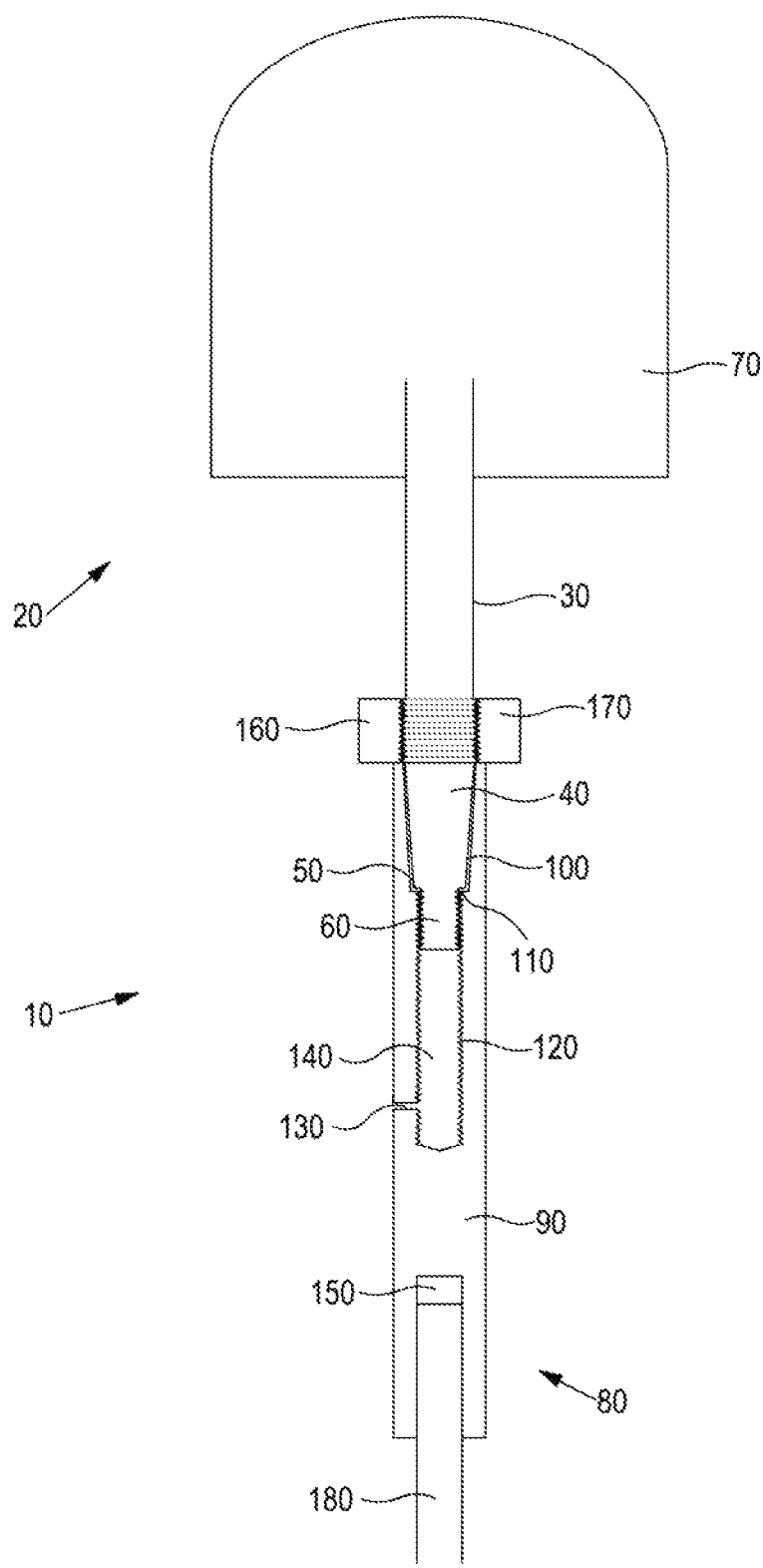
FIG. 4 is a schematic view of an assembly according to a second embodiment of the invention.

FIG. 4 shows the second embodiment of implement 20 assembled with a second embodiment of shaft 80. The second embodiment of handle 180 is arranged to cooperate with the second embodiment of implement 20 in the same manner as the first embodiments of handle 180 and implement 20. As shaft 80 is rotated, threaded portion 60 of elongate portion 30 engages with threaded portion 120 such that elongate portion 120 of shaft 80 moves longitudinally relative threaded portion 60 of implement 20 until shoulder 110 abuts against shoulder 50. Taper 40 is shaped for insertion into taper 100 to the extent at which shoulder 50 abuts against shoulder 110 and elongate portion 90 covers all or substantially all of taper 40.

When implement 20 is engaged with shaft 80, the second threaded portion 160 of implement 20 remains outside of and adjacent to elongate portion 30. A fastener in the form of a nut 170 is supplied for cooperation with second threaded portion 70. Nut 170 is supplied for tightening against the end of the female portion in order to provide additional bracing. In a preferred embodiment, the second threaded portion 160 is an opposite-direction thread to threaded portion 60.

Figure 5A:
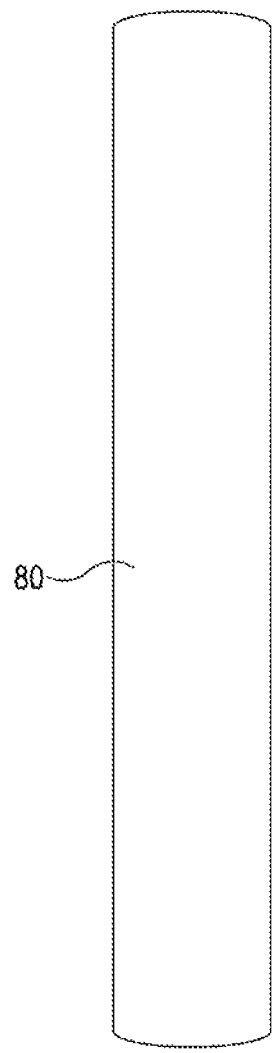
FIG. 5A is a schematic view of a first embodiment of a shaft of the invention.
Figure 5B:
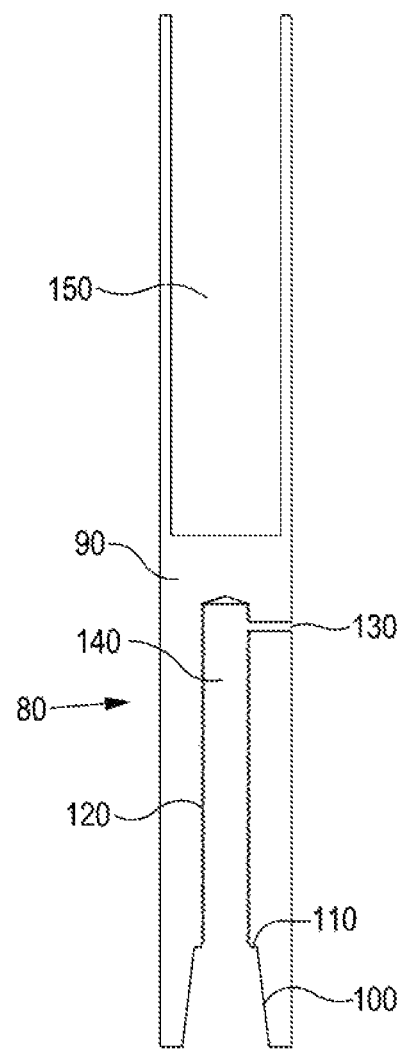
FIG. 5B is a section view of the first embodiment of a shaft of the invention.

FIG. 5A shows a schematic view of the embodiment of shaft 80 depicted in FIGS. 1 and 4. Shaft 80 is shown as having a substantially constant outside diameter across its length. FIG. 5B shows a section view of the first embodiment of shaft 80 with the dimensions of a preferred embodiment. Elongate portion 90 of shaft 80 extends 300 mm in a longitudinal direction and has an external diameter of 38 mm. At a first end, cavity 140 comprises taper 100 having a diameter of 26 mm. The elongate portion 90 has a wall thickness of 6 mm, giving an overall diameter of 38 mm.

Cavity 140 extends into elongate portion 90 to form a female member. As taper 100 extends into elongate portion 90, the diameter of cavity 140 reduces to 16 mm in proximity to shoulder 110 over a longitudinal distance of 30 mm. The remaining surface of cavity 140 is defined by an M16 ISO thread extending from the shoulder 110 by 100 mm in length. Aperture 130 connects the external surface of elongate portion 90 to cavity 140 proximal to a second end of cavity 140.

At a second end of implement 80, the second cavity 150 extends toward the first end by 150 mm and has a constant internal diameter of 33 mm.

Figure 6A:
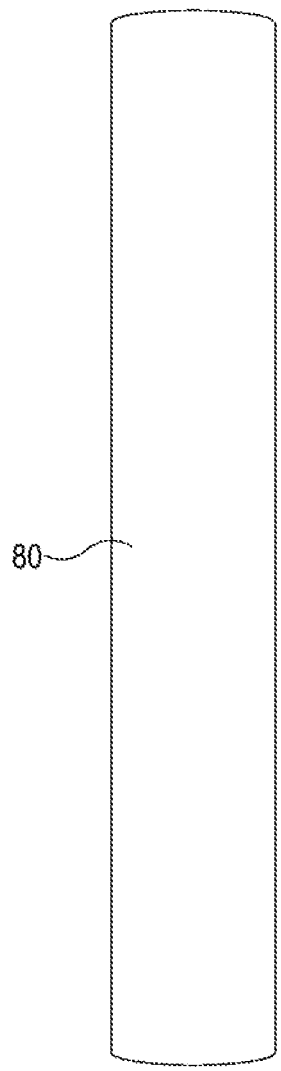
FIG. 6A is a schematic view of a second embodiment of the shaft of the invention.

FIG. 6A is a schematic view of a second embodiment of shaft 80, in which elongate portion is shown as having a substantially constant external diameter across its length of 38 mm.

Figure 6B:
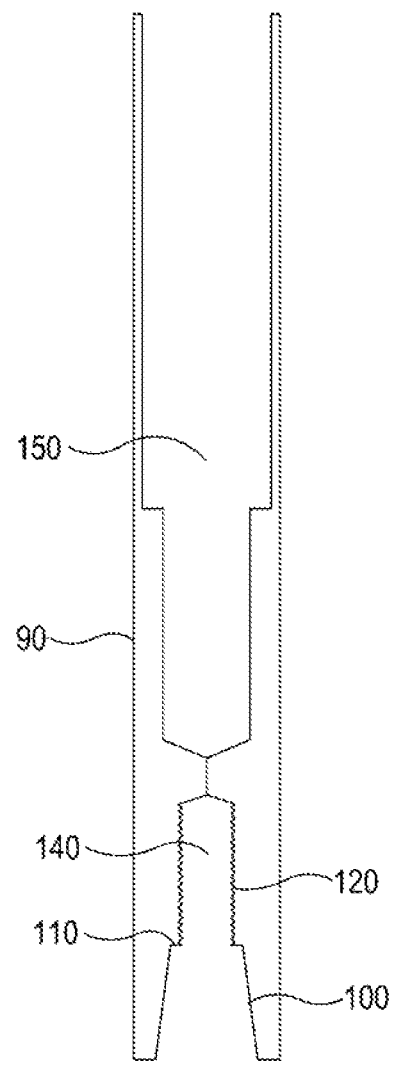
FIG. 6B is a section view of the second embodiment of the shaft of the invention.

FIG. 6B is a section view of the embodiment of FIG. 6A in which elongate portion 90 is shown as having a shorter cavity 140 as compared to the embodiments depicted in previous figures, and thus a longer second cavity 150 as compared to that of the first embodiment depicted in FIG. 5.

Elongate portion 90 of shaft 80 has a length of 300 mm in a longitudinal direction and an external diameter of 38 mm. At the first end, taper 100 has a diameter of 26 mm, the elongate portion having a wall thickness of 6 mm. Cavity 140 extends into elongate portion 90 to form a female member. Taper 100 reduces to 18 mm in diameter in proximity to shoulder 110 over a longitudinal distance of 30 mm. The remainder of the surface of cavity 140 is defined by an M16 ISO thread extending from a 2 mm shoulder, extending 40 mm in length inward from shoulder 110.

At the second end of shaft 80, a second cavity 150 extends towards the first end and has a first internal diameter of 33 mm. Second cavity 150 comprises a shoulder at an extent of 150 mm from the second end, and further extends toward the first end by an additional 60 mm at an internal diameter of 23 mm. The second cavity terminates in a concave surface arranged at an obtuse angle. The second cavity 150 has a total extent of 210 mm, extending inward from the second end.

Figure 7A:
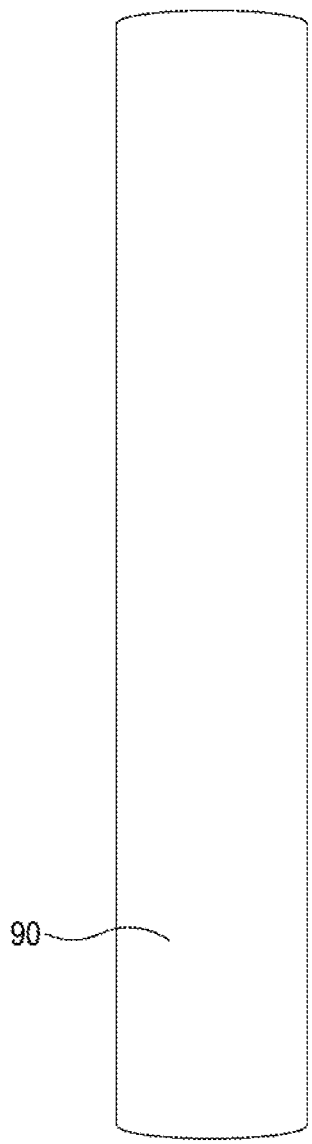
FIG. 7A is a schematic view of a third embodiment of the shaft of the invention.
Figure 7B:
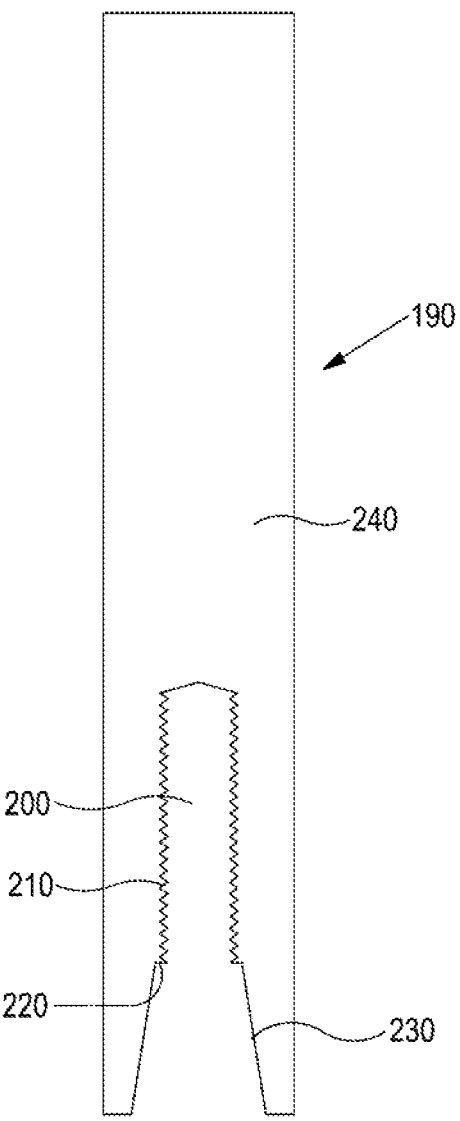
FIG. 7B is a section view of the third embodiment of the shaft of the invention.

FIGS. 7A and 7B show a third embodiment of the shaft in which the shaft comprises a handle 190. FIG. 7A shows a schematic representation of the external surface of the elongate portion 240. Elongate portion 240 of handle 190 has a substantially constant external cross sectional area and an external diameter of 38 mm.

FIG. 7B shows a section view of the third embodiment of shaft comprising a handle 190 as depicted in FIG. 7A. This negates the need for a separate handle; the features of the third embodiment of shaft are therefore modified accordingly. In the embodiment shown, handle 190 is fabricated of steel or aluminium. The material of handle 190 will be selected according considerations such as strength and weight.

The elongate portion 240 extends up to 1400 mm in a longitudinal direction and has a cavity 140 extending internally from the first end by 80 mm. At a first end, taper 230 has a diameter of 26 mm, the elongate portion 240 having a wall thickness of 6 mm. A cavity 200 extends into elongate portion 240 to form a female member. Taper 230 reduces to 18 mm in diameter in proximity to shoulder 220 over a longitudinal distance of 30 mm. Cavity 200 is defined by an M16 ISO thread extending from a 2 mm shoulder, and is 50 mm in length.

Figure 8:
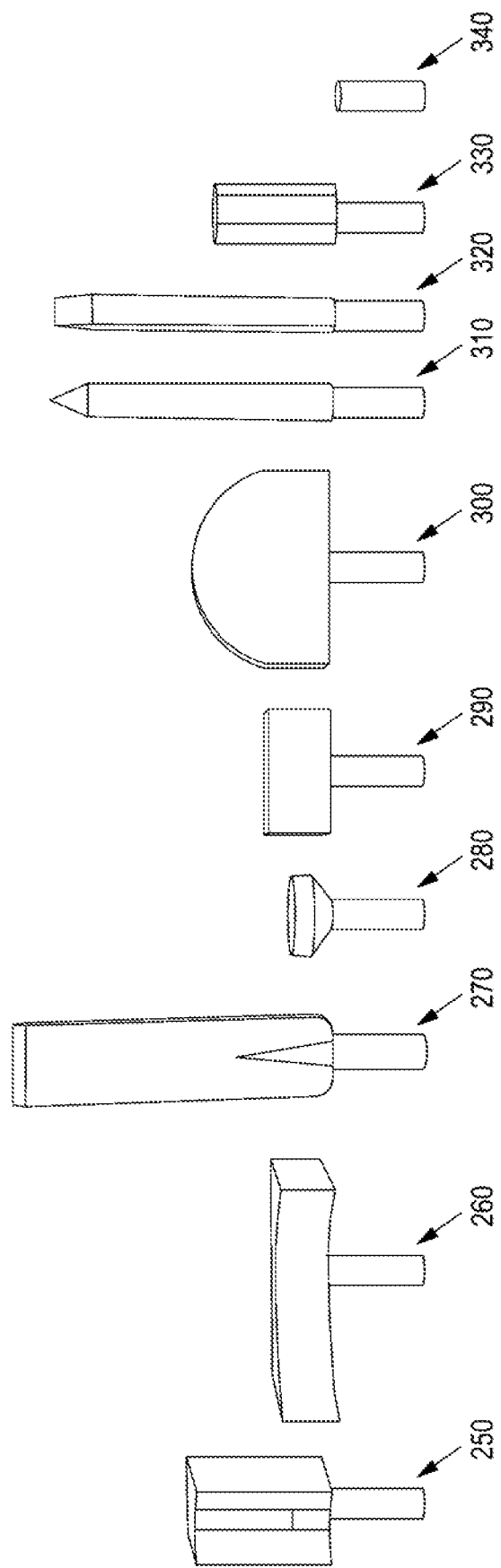
FIG. 8 is a perspective view of a first range of implements according to the invention.

FIG. 8 shows a range of implements 20, each with a different tool portion 70. The implements 20 shown are suitable for use in all embodiments of the invention.

In an example tool kit in accordance with the present invention, there is provided a sheeps foot compactor 250, a half-moon 260, a root cutter 270, a round dobber 280, a square compactor 290 for use in tarmac processing, a half round compactor 300, a pointed concrete cold chisel or bolster 310, a flat concrete chisel or bolster 320, a round compactor 330, and a blank end 340 for a digging instrument, fork or other implement that can be attached to a handle for impact work.

Figure 9:
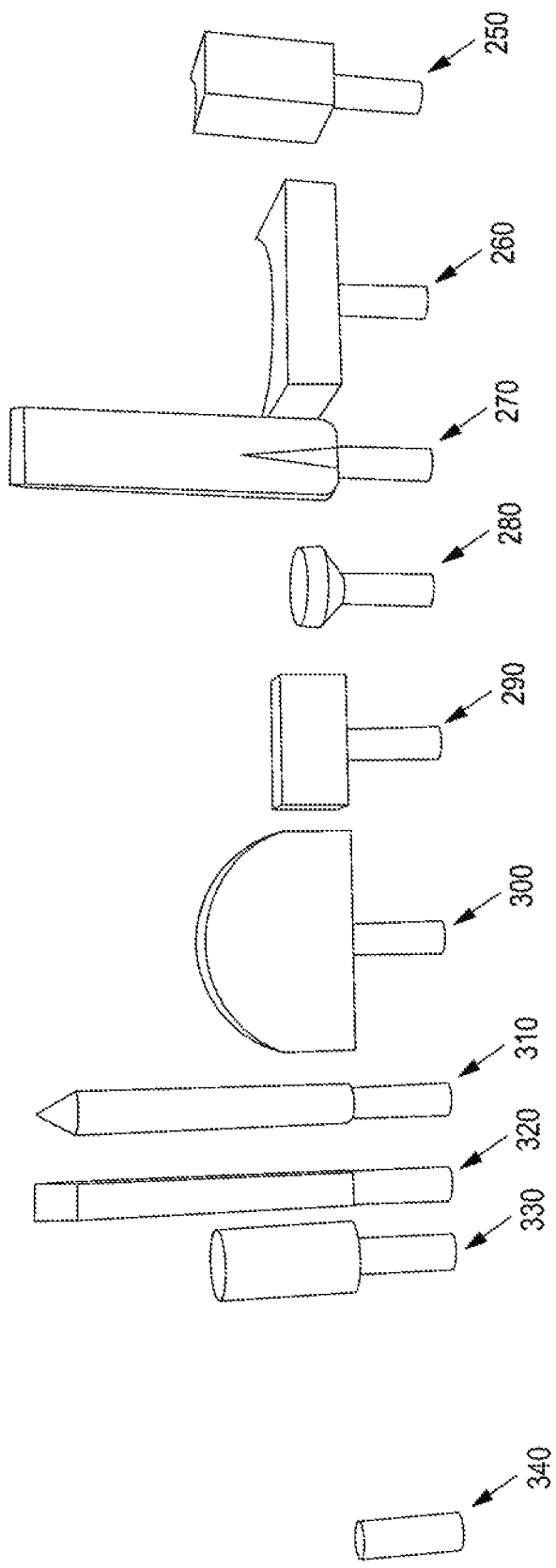
FIG. 9 is a perspective view of a second range of implements according to the invention.

FIG. 9 shows the tools of FIG. 8 depicted from the opposite side.

Figure 10:
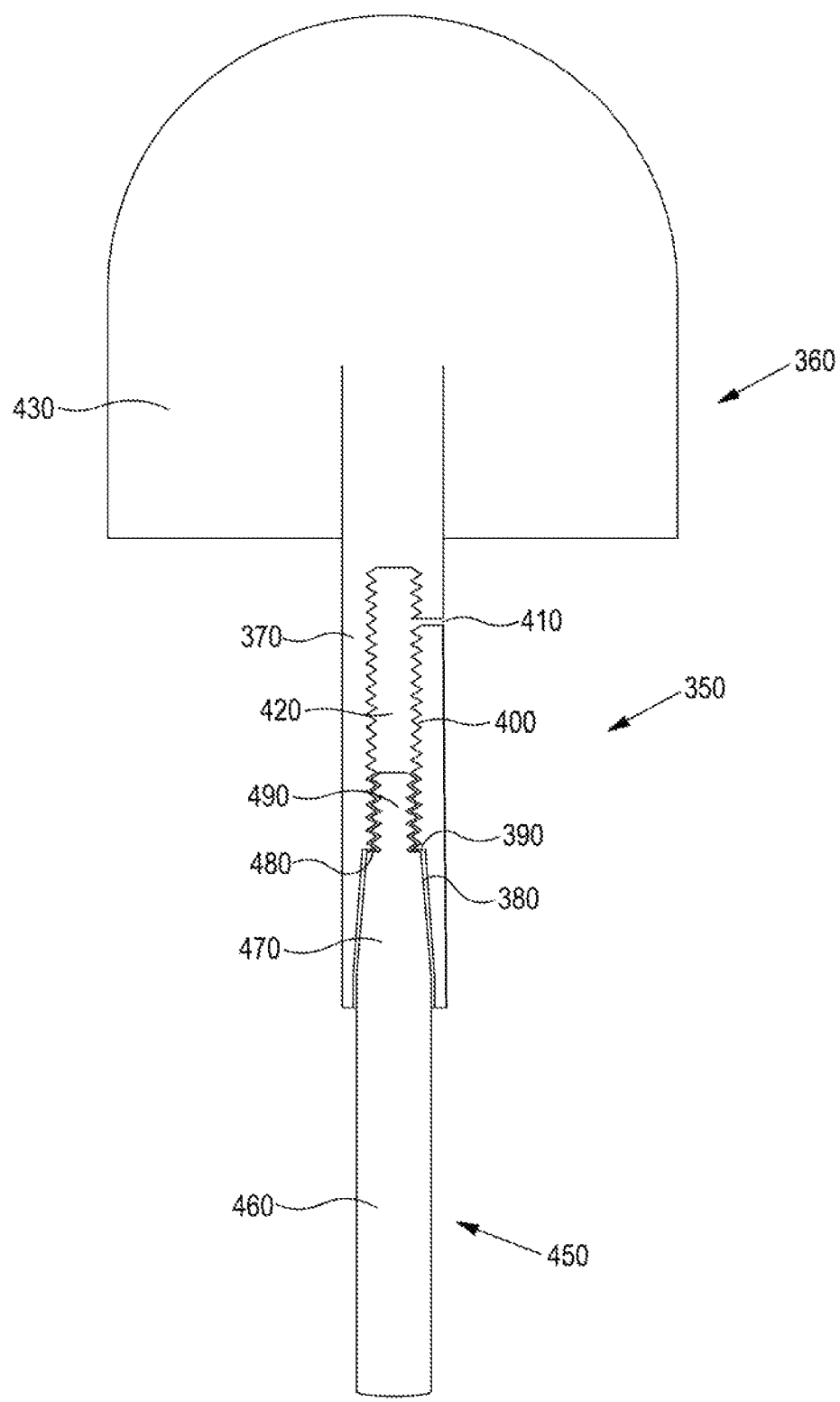
FIG. 10 is a schematic view of an assembly according to a third embodiment of the invention.

FIG. 10 shows a third embodiment of the invention in which the internal arrangements of the shaft and the implement are transposed. Tool 350 therefore comprises a implement 360, having an elongate portion 370 of substantially constant external cross sectional area. The elongate portion 370 has an internal cavity 420 formed of a taper 380 extending inwardly from a first end. A shoulder 390 located at the narrowest point of the taper further narrows the local internal cross sectional area of the cavity 420. Shoulder 390 provides a lateral surface perpendicular to the longitudinal axis of elongate portion 370 and, by extension, implement 360. Cavity 420 continues to extend from the shoulder 390 toward a second end of the implement 360 by a predetermined distance. The internal surface of the remainder of cavity 420 comprises threaded portion 400.

Implement 360 has a tool portion 440 at a second end. Said tool portion 440 is shown in the present embodiment as a blade for cutting or digging, but may take the form of any tool as indicated in FIGS. 8 and 9, or indeed, as any other known tool.

In the present embodiment, cavity 420 is vented to outside the implement 360 by aperture 410. The aperture 410 is present in embodiments in which it may be advantageous to apply a lubricant to the thread of threaded portion 400 to prevent corrosion or other degradation that may result in difficulty in engaging or disengaging threaded components. Aperture 410 may therefore be used as a port for the input of oil or other lubricant to aid the disassembly of tool 350.

The engagement of the shoulder 320 and the shoulder 400 provides a barrier against the ingress of moisture and dirt. However, aperture 410 may be present where moisture, dirt or fluid ingress into cavity 420 is anticipated, to allow for foreign matter to be removed or drained therefrom.

Shaft 450, in a third embodiment, comprises a handle that can be affixed to implement 360 without intermediate components. Shaft, or handle, 450 has an elongate portion 460 forming a handle for gripping in use. Adjacent elongate portion 460, a reducing taper 470 extends toward a first end, terminating in a shoulder 480. The shoulder 480 provides a surface perpendicular to the longitudinal axis of shaft 450. A threaded portion 490 having a substantially constant cross sectional area less than that of shoulder 480, extends from the shoulder 480 to the first end of shaft 450.

When shaft 450 is assembled with implement 360, shaft 450 forms a male portion. The external dimensions of taper 470, shoulder 480 and threaded portion 490 are selected such that the internal surfaces of taper 380, shoulder 390 and threaded portion 400 engage when the shaft is engaged with the implement 360 as female portion. The external cross sectional area of elongate portion 370 of implement 260 is substantially constant and greater than that of elongate portion 460.

Shaft 450 and implement 360 are assembled to form tool 350 by engaging threaded portions 400, 490. The first end of implement 370, comprising threaded portion 400, is inserted into cavity 370. Once threaded portions 400, 490 meet, one of the shaft 450 or implement 360 are rotated relative the other until the respective lateral surfaces of shoulders 390, 480 become proximal and the surfaces of taper 380 and 470 become parallel.

As per previous embodiments of the tool described herein, the present embodiment may form the basis for a kit of parts in which a range of implements 360 are supplied, in accordance with any one or number of tools as defined in FIGS. 8 and 9, for attachment to one or more shafts 450 of a single length or of differing lengths. Shaft 450 may be assembled with implement 360 to form tool 350 on site, and disassembled and stored once work is completed.

Figure 11:
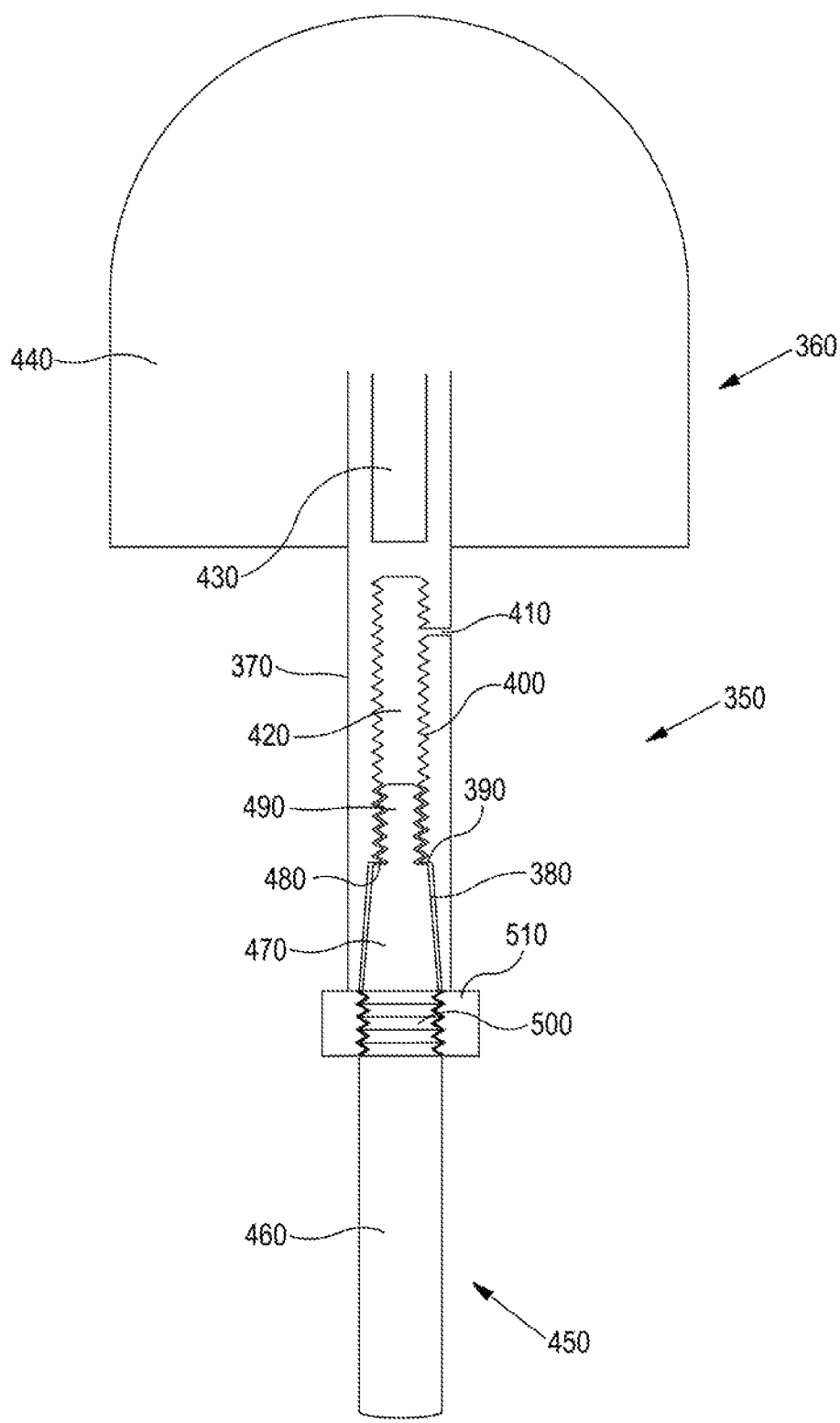
FIG. 11 is a schematic view of an assembly according to a fourth embodiment of the invention.

The tool 350 of FIG. 11 has substantially the same as the tool 350 depicted in FIG. 10. However, implement 360 further comprises a second cavity 430 arranged between cavity 420 and the second end of implement 360. The second embodiment of implement 360 comprising optional second cavity 430 can be present in tools according to the present invention that are required to be lighter, for ease of handling.

It will of course be understood that many variations may be made to the above-described embodiment without departing from the scope of the present invention.

The invention claimed is:

1. A tool suitable for use in digging, breaking concrete, cutting roots, loosening earth and stones, and similar operations which involve similar axial impact loads and similar non-axial impact loads, the tool comprising
   a shaft comprising a one-piece elongate portion having a first end and a second end, and
   a one-piece implement removably attachable to the shaft, comprising an elongate portion at a first end and a tool portion at a second end,
   wherein one of the one-piece, elongate portion of the shaft and the implement has, at its first end, a male portion comprising a reducing taper extending from the elongate portion and terminating at a shoulder, and a threaded portion extending from the shoulder and having a cross sectional area lesser than that of the shoulder, and
   the other of the one-piece, elongate portion of the shaft and the implement has, at its first end, a female portion comprising a reducing taper extending inwardly from the first end, a shoulder portion extending from the taper, and a threaded portion extending further inward from the shoulder, the shoulder portion being located longitudinally between the reducing taper and the threaded portion, wherein the male portion further comprises a second threaded portion extending from the taper toward the second end, and a fastener for cooperation with the second threaded portion.

2. The tool according to claim 1, wherein the one-piece, elongate portion of the shaft comprises the female portion and the implement comprises the male portion.

3. The tool according to claim 2, wherein the one-piece, elongate portion of the shaft further comprises a cavity extending inwardly from a second end for receiving a portion of a handle.

4. The tool according to claim 3, further comprising a handle for gripping when the tool is in use.

5. The tool according to claim 4, wherein a portion of the handle is bonded to the one-piece, elongate portion of the shaft.

6. The tool according to claim 1, wherein the one-piece, elongate portion of the shaft comprises the male portion and the implement comprises the female portion.

7. The tool according to claim 6, wherein the shaft comprises a handle for gripping when the tool is in use.

8. The tool according to claim 1, wherein the second threaded portion is an opposite-direction thread to threaded portion.

9. The tool according to claim 1, wherein the female portion further comprises an aperture between the threaded portion and an external surface of the tool.

10. The tool according to claim 1, wherein the female portion further comprises an aperture for external venting of the threaded portion.

11. The tool according to claim 1, wherein the implement is any one of a blade, a fork, a hammer, a chisel, a tamper, a dibber, a dobber, a digger, a drill, an auger, a rammer, a puller, a mattock, or a maul.

12. The tool according to claim 1, wherein the tool is fabricated from any one of a metal alloy, a polymer, a wood, a composite material, or a combination thereof.

13. The tool according to claim 12, wherein the one-piece, elongate portion of the shaft is fabricated from the same material as that of the implement.

14. The tool according to claim 12, wherein the one-piece, elongate portion of the shaft is fabricated from a material different from that of the implement.

15. A kit of parts for a tool suitable for use in digging, breaking concrete, cutting roots, loosening earth and stones, and similar operations which involve similar axial impact loads and similar non-axial impact loads, the tool comprising:

a shaft comprising a one-piece, elongate portion and an implement, wherein one of the one-piece, elongate portion of the shaft and the implement has, at the first end, a male portion comprising a reducing taper extending from the elongate portion and terminating in a shoulder, and a threaded portion extending from the shoulder and having a cross sectional area lesser than that of the shoulder, and the other of the shaft and the implement has, at the first end, a female portion comprising a reducing taper extending inwardly from the first end, a shoulder portion extending from the taper, and a threaded portion extending further inward from the shoulder, the shoulder portion being located longitudinally between the reducing taper and the threaded portion, wherein the one-piece, elongate portion of the shaft and the implement area arranged to be removably attached to one another by mating the male and the female portions; and wherein the male portion further comprises a second threaded portion extending from the taper toward the second end, and a fastener for cooperation with the second threaded portion.

16. The kit of parts according to claim 15 further comprising a fastener for removable attachment to the male portion, and for cooperation with the first end of the female portion.

17. The kit of parts according to claim 15, further comprising a handle for removable attachment to the female portion, and for cooperation with a second end of the female portion.

18. A one-piece tool implement suitable for use in digging, breaking concrete, cutting roots, loosening earth and stones, and similar operations which involve similar axial impact loads and similar non-axial impact loads, the tool comprising an elongate portion at a first end and a tool portion at a second end, wherein the elongate portion comprises a reducing taper terminating in a shoulder, and a threaded portion extending from the shoulder and having a cross sectional area lesser than that of the shoulder, in which the reducing taper, shoulder and threaded portion are on an internal face of a bore extending within the elongate portion, and in which the bore extends coaxially within the elongate portion; the tool portion further comprises a second threaded portion extending from the taper toward the second end, and a fastener for cooperation with the second threaded portion.

* * * * *